UNITED STATES PATENT OFFICE.

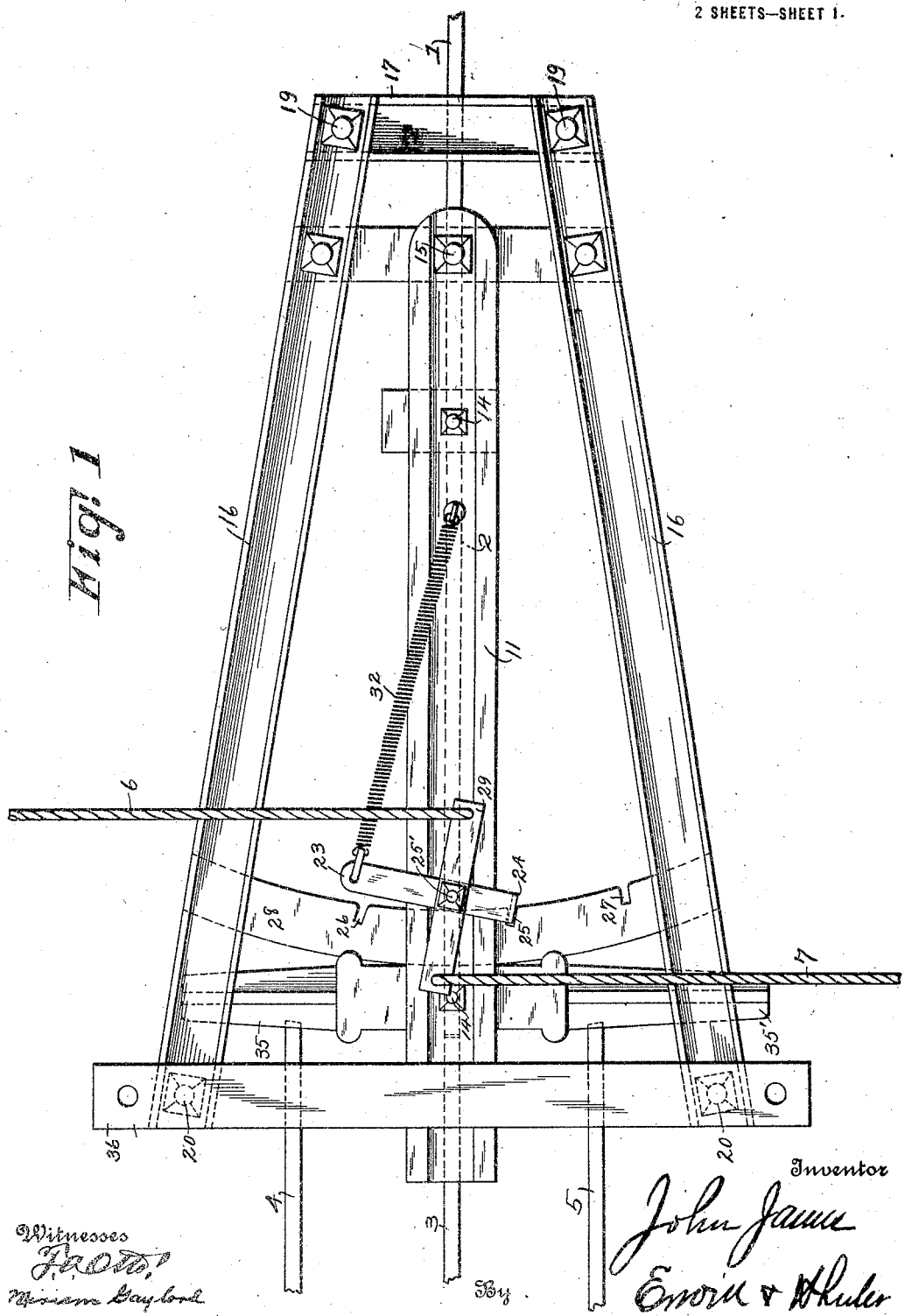

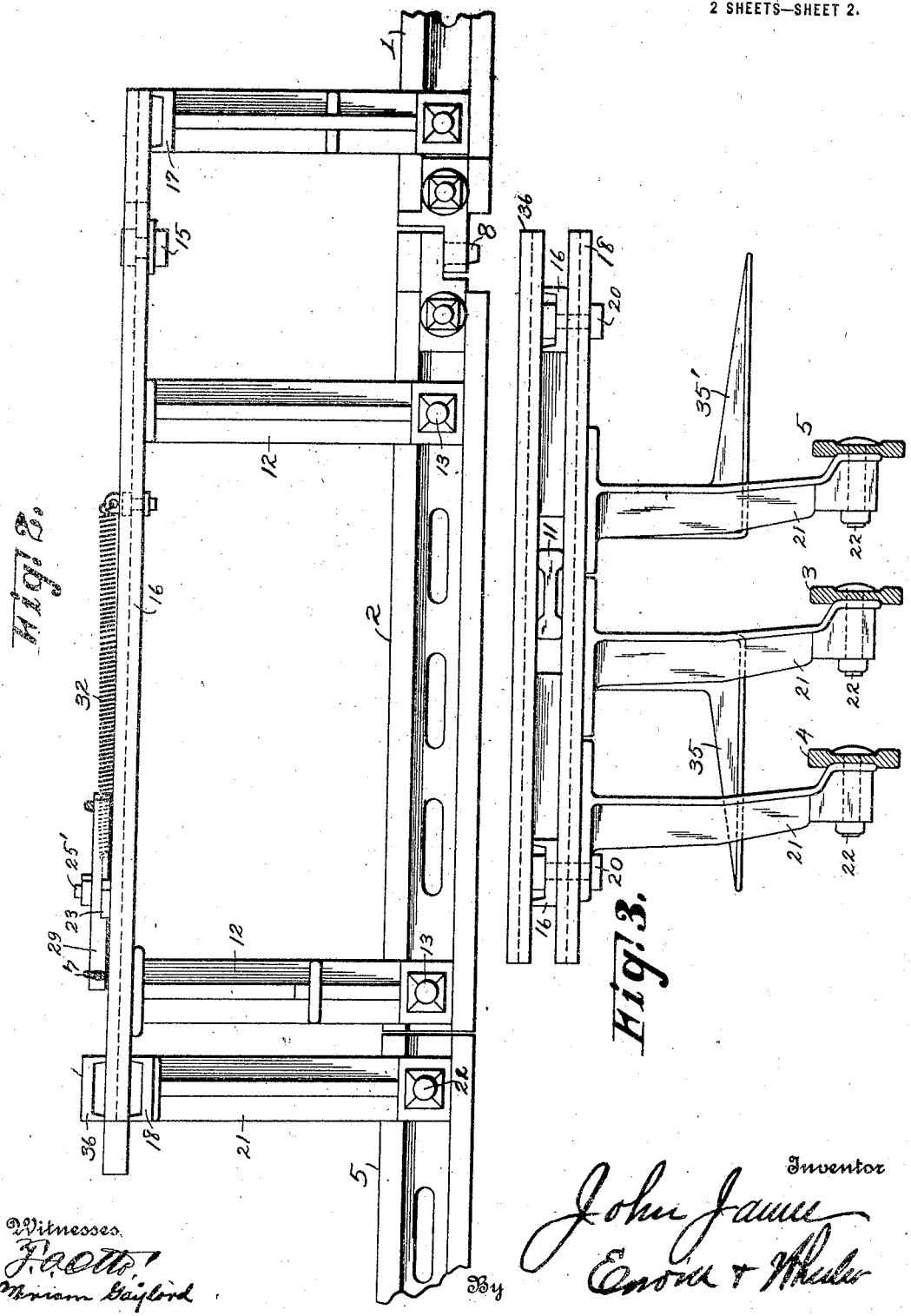

JOHN JAMES, OF FORT ATKINSON, WISCONSIN, ASSIGNOR TO JAMES MANUFACTURING COMPANY, OF FORT ATKINSON, WISCONSIN, A CORPORATION OF WISCONSIN.

SWITCH MECHANISM FOR OVERHEAD TRACKS.

1,178,470.     Specification of Letters Patent.     Patented Apr. 4, 1916.

Application filed February 9, 1914. Serial No. 817,419.

*To all whom it may concern:*

Be it known that I, JOHN JAMES, a citizen of the United States, residing at Fort Atkinson, county of Jefferson, and State of Wisconsin, have invented new and useful Improvements in Switch Mechanism for Overhead Tracks, of which the following is a specification.

My invention relates to improvements in that class of switches which are adapted to be used in connection with over head tracks for litter carriers, hay carriers and the like and by which the moving carriage, which is suspended from such tracks may be either switched from a single track to any one of a plurality of tracks or vice versa.

My invention pertains more especially, among other things; first, to the device for operating the switch from a distance; second, to the device for locking the movable switch bar in alinement with any one of a plurality of tracks; third, to the stop for preventing the carriage from running off the end of any one of the tracks when the switch bar is out of alinement therewith; fourth, to the device for moving such stop and holding it out of the line of movement of the moving carriage when the switch bar is in position to receive such carriage; and, fifth, to the general construction and arrangement of the several coöperating parts.

My invention is further explained by reference to the accompanying drawings in which—

Figure 1 is a plan view. Fig. 2 is a side view, and Fig. 3 is an end view.

Like parts are identified by the same reference numerals throughout the several views.

1 represents the main track which is adapted, by the movement of the switch bar 2, to be brought into connection with any one of the several tracks 3, 4 or 5. 6 and 7 are operating cables by which the switch bar 2 is operated. When the switch bar 2 is at the central position, shown in Fig. 1, the carriage carried thereon is adapted to pass freely from the track 1 to the track 3 and vice versa. When, however, it is desirous to connect the track 1 with the track 4, the operator has simply to draw upon the cable 6 when the switch bar 2 will be brought into alinement with the track 4 when the carriage will be free to pass from the track 1 to said track 4 and vice versa. When, however, it is desirous to move the carriage from the track 1 to the track 5, the operator draws upon the cable 7 when the switch bar 2 will be brought in alinement with the track 5 and the carriage will pass freely from the track 1 to the track 5 and vice versa.

The movable switch bar 2 is connected at one end with the track 1 by the hinge pin 8 which permits the opposite end of said switch bar to be swung toward the right or left, as may be required, in connecting its opposite end with any one of the several tracks 3, 4 or 5. The switch bar 2 is suspended from the central swinging bar 11 by a plurality of hangers 12, 12. The hangers 12 are connected at their lower ends with the switch bar 2 by the bolts 13 and with the bar 11 by the bolts 14, 14. The swinging bar 11 is pivotally connected at one end with a supporting frame by the bolt 15. The supporting frame consists of the two stationary side bars 16, 16 and end members 17 and 18. The side bars 16 are connected with the end member 17 by bolts 19 and with the end member 18 by the bolts 20. The several tracks 3, 4 or 5 are suspended from the end member 18 by a plurality of hangers 21 and bolts 22. It will be obvious that by this arrangement the switch bar 2 may be moved toward or from any one of the branch tracks 3, 4 or 5 by and with the swinging bar 11 from which such switch bar is suspended. Also that the same locking mechanism which holds said swinging bar also holds the switch bar which is suspended therefrom. As a means, therefore, of retaining said switch bar in alinement with any one of the several branch tracks 3, 4 or 5, I have provided said swinging bar 11 with a locking lever 23 which is pivotally supported from the front end of the swinging bar 11 by the pin 25'. One end of the locking lever 23 is provided with a lug 24. As one end of the lever 23 is drawn toward the right (reference being had to Fig. 1) by the re-coil of the spiral spring 32 the lug 24 which is connected with the opposite end of said lever from said spring is thrown toward the left and is thereby caused to engage in one of the notches 25, 26 or 27 formed in the arc-shaped plate 28, whereby the switch bar is securely locked in alinement with any one of the rails 3, 4 or 5. The locking lever 23 is connected with the operating cables 6 and 7 through the transversely arranged bar 29 and said bar 29 and lever 23 are rigidly connected together at their junction in any suitable manner, while the outer ends of said bar 29 are respectively connected with said operating cables 6 and 7 in any suitable manner. Thus it is obvious that when desirous to bring the free end of the switch bar 2 in alinement with the track 4, it is necessary simply to draw upon the cable 6, whereby said lug 24 will be brought out of engagement with its retaining notch while said switch bar will simultaneously move into alinement with the track 4. When, however, it is desirous to reverse the movement of said switch bar, it can be brought into alinement with either of the other two tracks 3 or 5 by drawing upon the cable 7 when the switch bar will be locked and retained in alinement with either of said tracks 3 or 5 by engagement of the lug 24 with one of said notches 25 or 27. Thus it is obvious that by the same movement of either cable 6 or 7 the switch bar is first unlocked and then swung into its proper position as previously described. The spring 32 is connected at one end with the locking lever 23 and at its opposite end to said bar 11, substantially as shown.

To prevent the carriage carried on any one of the tracks 3, 4 or 5 from being accidentally dropped therefrom when the switch bar 2 is out of alinement with such track, I have provided a pair of brackets 35 and 35' which brackets are rigidly connected with the swinging bar 11, as heretofore described, and are therefore adapted to be moved toward the right and left as the switch bar is brought into alinement with any one of the tracks 3, 4 or 5. Thus it is obvious that when the switch bar is in alinement with the track 3, as shown in Fig. 1, the bracket 35 will block the space above the track 4, while the bracket 35' will block the space above the track 5, as shown in Fig. 3, whereby a carriage supported on either of the tracks 4 or 5 would be brought in contact with said brackets 35 and 35' and consequently would be prevented from dropping from said tracks, while a carriage supported on the track 3 would be free to pass over the switch bar to the track 1. When, however, the switch bar is moved toward the left, said bracket 35' would be caused to close the space above the tracks 3 and 5, thereby preventing the carriage from dropping from either of said tracks 3 or 5, while a carriage supported on the track 4 would be free to pass forward over the switch bar to said track 1. It will now be obvious that when a carriage is on the track 5 and the switch bar is moved in alinement with said track, the bracket 35' will be brought out of the line of movement of said carriage, thereby permitting the carriage to move forward over the switch bar to said track 1, while a carriage upon either the tracks 3 or 4 would be blocked by the bracket 35. The brackets 35 and 35' are rigidly suspended at their upper ends from the swinging bar 11 and the free end of said swinging bar 11 is slidably supported between the bars 36 and 18.

While I have shown and described three branch tracks, 3, 4 and 5, it is obvious that the number of such tracks may be increased or diminished as circumstances may require.

Having thus described my invention what I claim as new and desire to secure by Letters Patent is—

1. The combination of a stationary frame, a swinging bar pivotally connected at one end to said stationary frame, a switch bar pivotally connected at one end with a single track, its opposite end being adapted to be brought into alinement with a plurality of branch tracks, means for suspending said switch bar from said swinging bar, means for automatically locking said swinging bar and thereby retaining the same in alinement with any one of a plurality of branch tracks and means for manually releasing said locking mechanism and simultaneously removing said switch bar from one of said branch tracks to another.

2. In a switch for over head tracks, the combination of a stationary frame, a swinging bar pivotally connected at one end to said stationary frame, a pair of operating cables, each connected at one end to said swinging bar and extending respectively from thence in opposite directions terminating within reach of the operator, a switch bar pivotally connected at one end with a single track, its opposite end being adapted to be brought into alinement with a plurality of branch tracks, means for suspending said switch bar from said swinging bar, means for automatically locking said swinging bar and thereby retaining said switch bar in alinement with any one of a plurality of branch tracks, said locking mechanism being manually released and said swinging bar and said switch bar being simultaneously moved by drawing upon one of said cables.

3. In a switch for over head tracks, the combination of a stationary frame comprising two side bars and two end bars rigidly connected together, a swinging bar pivotally connected at one end to one of said end bars, a switch bar pivotally connected at one end with a single track, a plurality of branch tracks, means for suspending said switch bar from said swinging bar, a locking lever pivotally connected near its center with said swinging bar, a spiral spring connected at one end with said locking lever and at its opposite end to said swinging bar, a locking lug connected with the end of said locking lever opposite its connection with said spring, a pair of cables each connected at one end with said swinging bar and respectively passing from thence in opposite directions terminating within reach of an operator, an arc-shaped bar provided with a plurality of recesses, said spiral spring being adapted to normally retain said locking lug against the bearing surface of said arc-shaped bar and cause the same to engage in the retaining recesses formed in such bar, said locking lug being manually withdrawn from said recesses and moved by the lateral pull upon either one of said cables and automatically moved in the opposite direction by the recoil of said spring.

4. In a switch for over head tracks, the combination of a stationary frame comprising two side bars and two end bars rigidly connected together, a swinging bar pivotally connected at one end to one of said end bars, a switch bar pivotally connected at one end with single track, a plurality of branch tracks, means for suspending said switch bar from said swinging bar, a locking bar pivotally connected with said swinging bar, a spiral spring connected at one end with said locking bar and at its opposite end to said swinging bar, a bar rigidly connected near its center to said locking bar, a pair of cables each connected at one end with opposite ends respectively of said last named bar and respectively passing from thence in opposite directions terminating within reach of an operator, an arc-shaped bar provided with a plurality of recesses, said spiral spring being adapted to normally retain a lug connected with one end of said locking bar against the bearing surface of said arc-shaped bar and cause the former to enter the retaining recesses in said arc-shaped bar, said lug being manually withdrawn from one of said recesses and moved to the next by a lateral pull upon either one of said cables and to be automatically moved in the opposite direction and thrown into one of said retaining recesses by the recoil of said spring, a plurality of carriage stops suspended from said swinging bar, said stops being adapted to be moved laterally with said switch bar above said branch tracks, whereby the liability of a carriage being accidentally dropped from any one of said branch tracks when the switch bar is out of alinement with such track is avoided.

5. In a switch for over head tracks, the combination of a stationary frame comprising two side bars and two end bars rigidly connected together, a swinging bar pivotally connected at one end to one of said end bars, a switch bar pivotally connected at one end with a single track, a plurality of branch tracks, means for suspending said switch bar from said swinging bar, a locking bar pivotally connected with said swinging bar, a spiral spring connected at one end with said locking bar and at its opposite end to said swinging bar, a bar rigidly connected near its center with said locking bar a pair of cables each connected at one end with one end of said last named bar and respectively passing from thence in opposite directions from said bar, a locking lug connected with one end of said locking bar, an arc-shaped bar provided with a plurality of recesses, said spiral spring being adapted to normally retain said lug against the bearing surface of said arc-shaped bar and cause the same to enter the retaining recesses in said bar, said lug being manually withdrawn from one of said recesses and moved to the next recess by the lateral pull upon either one of said cables and to be automatically moved in the opposite direction by the recoil of said spring, a plurality of carriage stops rigidly suspended from said swinging bar, said stops being adapted to prevent a carriage from being accidentally dropped from any of said tracks when the switch bar is out of alinement therewith.

6. In a device of the described class, the combination with a main track and a set of branch tracks, of a stationary frame supported above the tracks, a swinging bar pivotally connected to and adapted to swing horizontally thereon, a switch bar pivotally connected to the main track at one end and adapted to swing in the horizontal plane of the main track either into alinement therewith or into registry at its opposite end with a plurality of branch tracks, means for retaining said switch bar in alinement with any one of a plurality of branch tracks, and means for moving said switch bar from one of said tracks to another.

7. In a device of the described class, the combination with a main track and a set of branch tracks, of a stationary frame supported above the tracks, a swinging bar pivotally connected at one end to and adapted to swing horizontally thereon, a pair of flexible bar actuating members each connected at one end with said swinging bar and extending respectively in opposite directions, a switch bar pivotally connected to the main track and adapted to swing in the horizontal plane thereof, to carry its opposite end into registry with any one of the set of branch tracks, means for supporting said switch bar from said swinging bar, and means for retaining said switch bar in registry with any one of a plurality of branch tracks.

8. In a track system for suspended carriers, the combination with a switch actuating member located above the level of the tracks in said system and adapted for horizontal movement in two directions, of a latch pivotally connected with said switch actuating member, a stationary catch bar with which said latch may engage, a spring for actuating said latch into engagement with the catch bar, and flexible actuating devices connected with the latch on opposite sides of its pivotal connection with the switch actuating member, whereby a pull upon either of said flexible connections will initially release the latch and then operate the switch actuating member.

In testimony whereof I affix my signature in the presence of two witnesses.

JOHN JAMES.

Witnesses:
　AL WARD,
　HARRY C. SEAVERT.